UNITED STATES PATENT OFFICE.

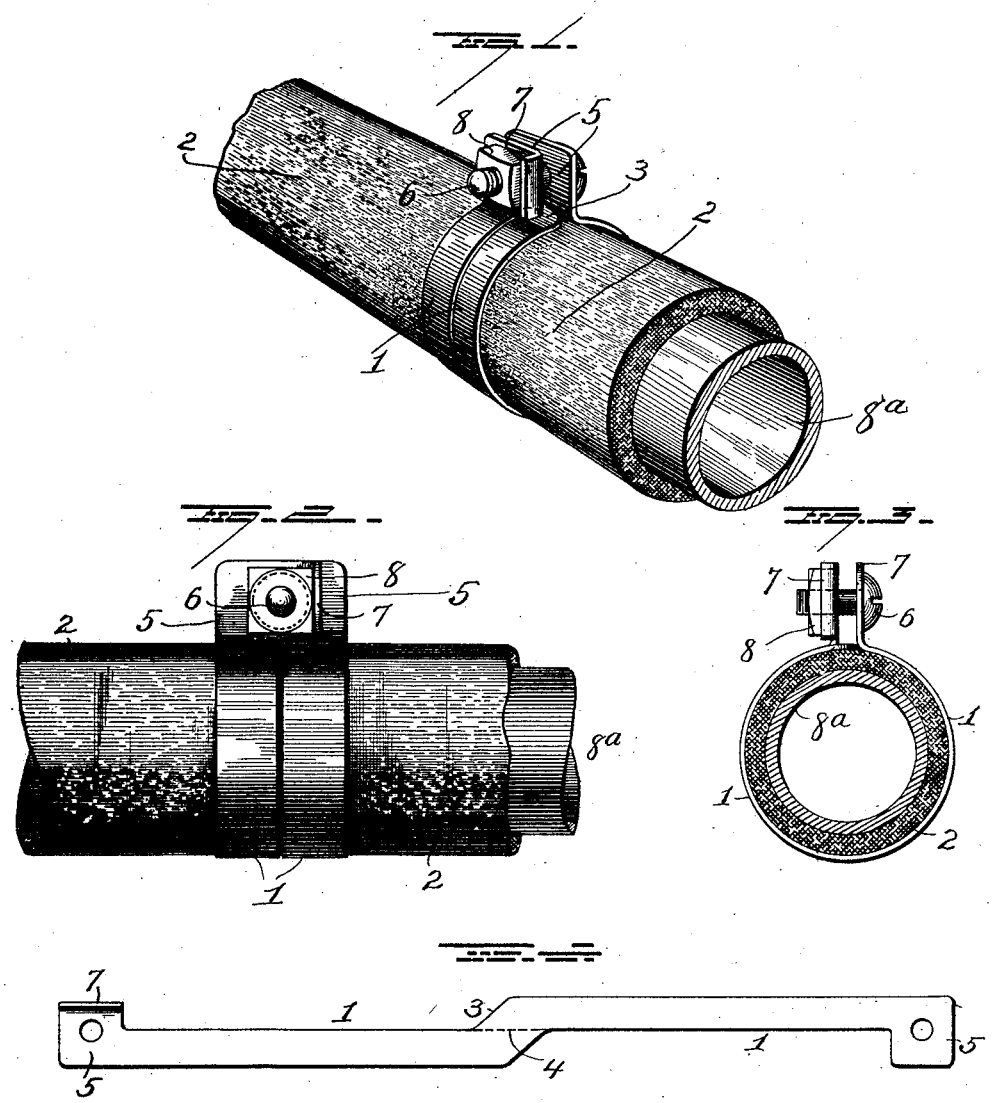

CARL J. LUNDGREN, OF MOUNT JEWETT, PENNSYLVANIA, ASSIGNOR OF ONE-HALF TO HUGO J. WALTER, OF BRADFORD, PENNSYLVANIA.

HOSE-CLAMP.

1,383,134.     Specification of Letters Patent.     Patented June 28, 1921.

Application filed April 12, 1920. Serial No. 373,210.

*To all whom it may concern:*

Be it known that I, CARL J. LUNDGREN, a citizen of the United States, and a resident of Mount Jewett, in the county of McKean and State of Pennsylvania, have invented certain new and useful Improvements in Hose-Clamps; and I do hereby declare the following to be a full, clear, and exact description of the invention, such as will enable others skilled in the art to which it appertains to make and use the same.

My invention relates to an improvement in hose clamps the object being to provide a cheap and simple device that may be readily and quickly applied to a hose coupling and when so secured will bind the hose to the coupling or nozzle with an even pressure at all points around the hose and thus absolutely prevent the leakage of steam, water, air or any gas or liquid at the point of its attachment to the coupling or nozzle.

With this end in view my invention consists in the details of construction as will be more fully described and pointed out in the claim.

In the accompanying drawings, Figure 1 is a view in perspective of a section of a hose and a metal pipe connected by my improved clamp; Fig. 2 is a view in side elevation of the clamp; Fig. 3 is a view in end elevation of the same, and Fig. 4 is a view of the clamp or blank straightened out.

My improved clamp is made of sheet metal strip 1 sufficiently light to be readily and easily bent and which when under pressure or pull as will be hereinafter explained, will conform to the hose 2 around which it is wrapped.

The metal strip 1 is of a length to encircle the hose twice, and is enlarged and offset at its center as at 3, with the two half lengths projecting at opposite sides of a line 4 passing centrally through the said enlargement so that when the strip is bent into circular form and encircling the hose twice, the two end sections will lie parallel to each other and not overlap except at the free ends.

The free ends 5 of the strip are enlarged laterally in opposite directions and each is provided with a bolt hole for the passage of a bolt 6, and one enlarged end is provided with a turned edge or flange 7 which forms a lock for the nut 8 and prevents the latter from turning as the bolt 6 is turned to secure and tighten the clamp on a hose.

In applying the clamp, the end of a flexible hose 2 is placed over a coupling, pipe, nozzle or other part 8 to be connected to the hose, and the band or clamp 1 is wrapped twice around the hose or having been placed on the hose is moved to the point where the hose overlaps the pipe the construction being such that the two free ends of the band terminate over the enlarged part 3 of the band. The two ends 5 are bent so as to rest parallel over the enlarged part 3, and each is provided as previously explained with a bolt hole for the passage of the bolt 6 the free end of which is engaged by the nut 8 for locking the clamp in place, the nut being held from turning with the bolt by the flange 7 formed by bending one edge of one end. With this construction it will be seen that by screwing up on the bolt, the band which may be of light flexible metal will be drawn tightly around the entire circumference of the hose and exert an even clamping pressure all around, the enlarged part 3 of the clamp or strip resting in a plane between the two ends of the clamp and absolutely preventing any bulging or folding of the hose at that point.

The clamp may be stamped from strap or sheet metal and can be readily applied by any one with the aid of a screw driver alone, and when applied will not only clamp the hose to a coupling or pipe, but will clamp it evenly all around and absolutely prevent any leakage.

Having fully described my invention what I claim as new and desire to secure by Letters-Patent, is:—

A hose clamp consisting of a sheet metal strip offset approximately at its center so that when wrapped around a hose the two half portions thereof will be parallel and each approximately encircle the hose with the offset portion resting in a plane between the two free ends of the clamp, each free end of the clamp being enlarged laterally in opposite directions so as to overlap, one of said free ends having plain flat surfaces and the other having the free side edge of its laterally enlarged end bent up to form a lock for a nut, both of said laterally bent ends being without flanges other than the nut locking flange so that they can yield or give to accommodate themselves to variations in the diameter of the hose.

In testimony whereof, I have signed this specification in the presence of two subscribing witnesses.

CARL J. LUNDGREN.

Witnesses:
 LAURENCE E. STEWART,
 S. LUNDBERG.